(No Model.)

J. C. VAIL.
HORSE TAIL HOLDER.

No. 289,873. Patented Dec. 11, 1883.

Witnesses:
H. W. Well,
Rich'd A. Goldsbrough.

Inventor,
Joseph C. Vail,
per A. B. Upham,
Attorney in fact

UNITED STATES PATENT OFFICE.

JOSEPH C. VAIL, OF MAPLE'S MILL, ILLINOIS.

HORSE-TAIL HOLDER.

SPECIFICATION forming part of Letters Patent No. 289,873, dated December 11, 1883.

Application filed October 15, 1883. (No model.)

*To all whom it may concern:*

Be it known that I, JOSEPH C. VAIL, of Maple's Mill, in the county of Fulton, in the State of Illinois, have invented an Improved Horse-Tail Holder; and I do hereby declare that the following is a full, clear, and exact description thereof, reference being had to the annexed drawings, making a part of this specification, in which like letters of reference refer to like parts, and in which—

Figure 1:
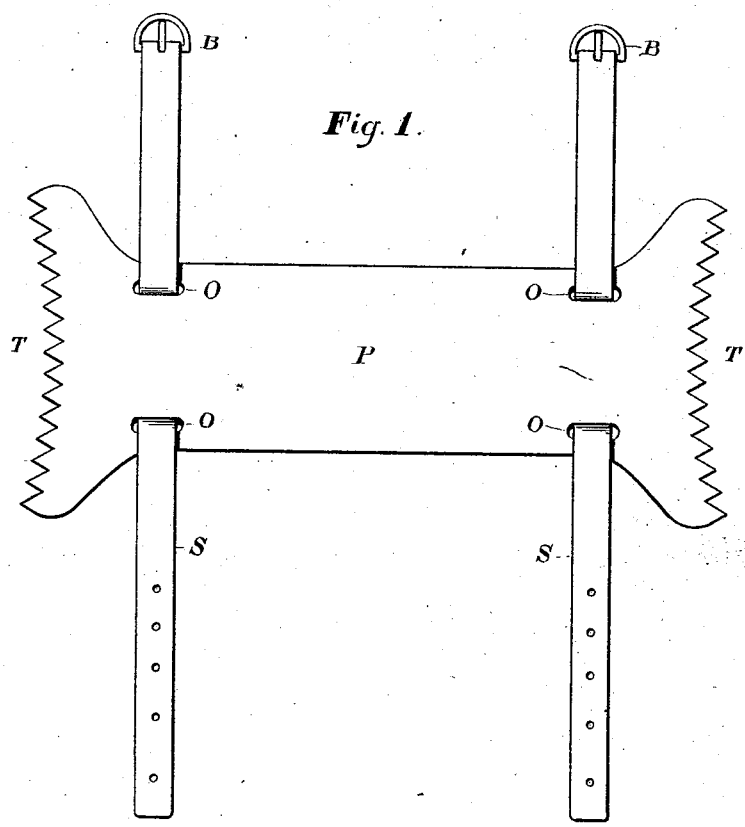
Figure 2:
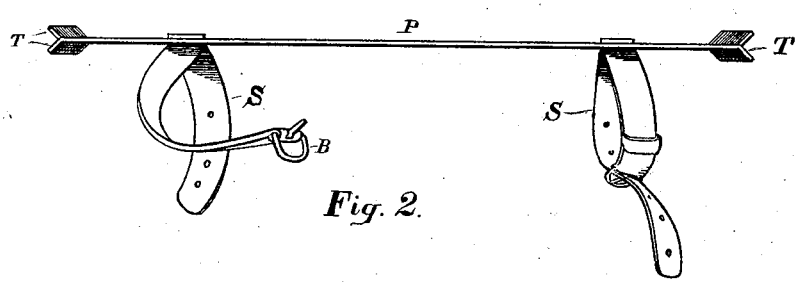

Figure 1 represents a side view of the same; Fig. 2, edge view.

The object of this invention is the construction of an implement or device by means of which to do up a horse's tail, and thereby keep it from getting bedraggled or dirty, and also to give it a wavy appearance when unfolded.

My device consists of a flat plate toothed at its opposite ends, and furnished with straps or other ties, by which to bind all in place after a horse's tail has been wound thereon.

In the drawings, P is the plate, having teeth T T; and S S are the straps. The toothed ends are, as shown in Fig. 1, made concave in outline for the purpose of confining more surely the tail in place thereon in winding it about said plate. The teeth T T are bent alternately toward opposite sides of the plate, so that they stand at an angle of forty-five degrees with said plate and ninety degrees with each other. The object of these teeth T and of this angularly-projecting position of them is that they may engage with and hold the hair composing the tail securely in place upon the plate P. The main body part of said plate P is narrower than its toothed ends, as shown in Fig. 1, the object of this being to lessen the weight and expense by the decrease in material, and also to improve the appearance of the device. The holes O O are for the insertion of the straps S S, by which the holder-plate P is secured in position. Said straps S S are supplied with buckles B B and suitable holes at the opposite ends of the straps for fastening the same.

I usually make the plate P about five inches long and two inches wide, and have the straps S S from ten to fourteen inches in length each.

For a fastening device I sometimes use strings, tapes, and ribbons, but prefer to employ straps S, as shown.

In using this tail-holding device the ends of the hair are first braided for a short distance, then wound about the ends of the plate P. I then revolve said plate end over end until the tail has been wound thereon as much as desired, and, passing the straps about the bunch, buckle them tightly, pressing the hairs well onto the teeth T.

What I claim as my invention is—

1. A horse-tail holder consisting of the plate P, having teeth T, in combination with a strap or equivalent device for binding said plate in place, substantially as and for the purpose specified.

2. A horse-tail holder consisting of the plate P, having openings O and toothed concave ends, in combination with the straps S S, having buckles B B, substantially as set forth.

In testimony that I claim the foregoing invention I have hereunto set my hand this 11th day of October, 1883.

JOSEPH C. VAIL.

Witnesses:
J. C. WILCOXEN,
FREDERICK M. GRANT.